United States Patent
Coughlin et al.

(10) Patent No.: US 10,719,455 B2
(45) Date of Patent: *Jul. 21, 2020

(54) STORAGE DEVICE AUTHENTICATION

(71) Applicant: Amazon Technologies, Inc., Seattle, WA (US)

(72) Inventors: Chesley B. Coughlin, Issaquah, WA (US); Eric M. Wagner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,487

(22) Filed: Aug. 24, 2018

(65) Prior Publication Data

US 2019/0012272 A1 Jan. 10, 2019

Related U.S. Application Data

(63) Continuation of application No. 15/050,082, filed on Feb. 22, 2016, now Pat. No. 10,061,716, which is a
(Continued)

(51) Int. Cl.
*G06F 12/14* (2006.01)
*G06F 21/60* (2013.01)
(Continued)

(52) U.S. Cl.
CPC ........ *G06F 12/1408* (2013.01); *G06F 21/606* (2013.01); *G06F 21/80* (2013.01);
(Continued)

(58) Field of Classification Search
CPC ..................................................... G06F 12/14
See application file for complete search history.

(56) References Cited

U.S. PATENT DOCUMENTS 6,463,535 B1 10/2002 Drews
6,546,492 B1 4/2003 Walker et al.
(Continued)

FOREIGN PATENT DOCUMENTS

EP 0871141 10/1998
JP 200192827 4/2001
(Continued)

OTHER PUBLICATIONS

International Search Report and Written Opinion from Singapore Patent Application No. 201108283-1, dated Nov. 19, 2013, Amazon Technologies, Inc., pp. 1-14.
(Continued)

*Primary Examiner* — Esther B. Henderson
(74) *Attorney, Agent, or Firm* — Robert C. Kowert; Kowert, Hood, Munyon, Rankin & Goetzel, P.C.

(57) ABSTRACT

Systems and methods authenticate storage devices. In one implementation, a computer-implemented method is provided for authenticating a storage device. According to the method, a manifest that identifies a destination is receive. A transfer station reads a digital signature from the storage device. The digital signature is validated and, based on the validation of the digital signature, a transfer of one or more files from the storage device via the transfer station is authorized to the destination identified in the manifest.

20 Claims, 4 Drawing Sheets

Related U.S. Application Data continuation of application No. 12/453,614, filed on May 15, 2009, now Pat. No. 9,270,683.

(51) Int. Cl.
  *G06F 21/80* (2013.01)
  *H04L 9/32* (2006.01)
  *H04L 29/06* (2006.01)

(52) U.S. Cl.
  CPC .......... *H04L 9/3247* (2013.01); *H04L 9/3268* (2013.01); *H04L 63/061* (2013.01); *H04L 63/12* (2013.01); *G06F 2212/1052* (2013.01); *G06F 2221/2129* (2013.01)

(56) References Cited

U.S. PATENT DOCUMENTS

| | | | |
|---|---|---|---|
| 6,725,373 | B2 | 4/2004 | Carbajal et al. |
| 7,533,269 | B2 * | 5/2009 | Kumagai ................. G06F 21/64 713/176 |
| 7,814,551 | B2 | 10/2010 | Darweesh et al. |
| 9,270,683 | B2 | 2/2016 | Coughlin et al. |
| 10,061,716 | B2 | 8/2018 | Coughlin et al. |
| 2003/0009365 | A1 | 1/2003 | Tynan et al. |
| 2003/0078880 | A1 | 4/2003 | Alley et al. |
| 2003/0163701 | A1 | 8/2003 | Ochi et al. |
| 2003/0233552 | A1 | 12/2003 | Baldwin et al. |
| 2007/0005758 | A1 | 1/2007 | Hughes, Jr. |
| 2007/0067620 | A1 | 3/2007 | Jevans |
| 2007/0294457 | A1 | 12/2007 | Gantman et al. |
| 2009/0006640 | A1 | 1/2009 | Brouwer et al. |
| 2009/0041244 | A1 | 2/2009 | Lee et al. |
| 2010/0251390 | A1 | 9/2010 | Shimura et al. |
| 2011/0225640 | A1 | 9/2011 | Ganapathy et al. |

FOREIGN PATENT DOCUMENTS

| | | |
|---|---|---|
| JP | 200846830 | 2/2008 |
| JP | 200987053 | 4/2009 |

OTHER PUBLICATIONS

Office Action from Japanese Patent Application No. 2012/511003, dated Apr. 2, 2013, (English Translation and Japanese Versions), pp. 1-13.
International Search Report for Application No. 10775523.3-1870/2430548, dated Apr. 23, 2014, pp. 1-6.
International Search Report and Written Opinion from PCT/US 10/34678, dated Jul. 9, 2010, 7 Pages.
Alexis Madrigal, "Google to Host Terabytes of Open-Source Science Data," Wired Science, http://www.wired.com/wirescience/2008/01/google-to-prrovi/, Jan. 18, 2008 (2 pages).
Beth Pariseau, "Iron Mountain opens file archiving service," SearchStorage.com, Storage Technology News, http://searchstorage.techtarget.com/newslarticle/0,289142,sid5_gci1348947.00.html, Feb. 24, 2009 (3 pages).
Digital Iron Mountain, "Interactive Data File Archiving," http://www.ironmountain.com/digital/vfs/, retrieved May 14, 2009 (2 pages).
Nirvanix, "Nirvanix Ingestion ServicesL Nirvanix Oatasheet," 2008 (2 pages).
Amazon.com, "Amazon Web Services: What is AWS?," http://aws.amazon.com/what-is-aws/, retrieved May 14, 2009 (3 pages).
Amazon.com, "Your AWS Credentials," http://docs.amazonwebservices.com/AWSFWS/latesVDeveloperGuide/index.html?AWSCredentials.html, retrieved May 14, 2009 (2 pages).
Webopedia.com, "What is Public-Key Encryption?," http://www.webopedia.com/TERM/P/public_key_crytograph.html last modified Oct. 9, 2003, 5 Pages.

* cited by examiner

STORAGE DEVICE AUTHENTICATION

This application is a continuation of U.S. patent application Ser. No. 15/050,082, filed Feb. 22, 2016, now U.S. Pat. No. 10,061,716, which is a continuation of U.S. patent application Ser. No. 12/453,614, filed May 15, 2009, now U.S. Pat. No. 9,270,683, which are hereby incorporated by reference herein in their entirety.

BACKGROUND

Anyone who wishes to transfer data over a network to a storage location is faced with the question of how to securely transfer the data in a timely manner. In cloud computing, for example, developers and other users access a service that provides dynamic and resizable compute capacity without requiring the developers to have knowledge of, or control over, the technological infrastructure that provides the service. Developers, for example, that use cloud computing sometimes have a need to upload substantial amounts of data to a network storage location.

To access a network, for example, a developer may use a fiber optic line, such as a T1 line. A T1 line can carry data at a rate of approximately 1.544 megabits per second. Using a single T1 line to continuously transfer data, it would take approximately an entire month to transfer 400 gigabytes of data. If a developer wishes to transfer data at a faster rate or does not wish to burden a T1 line with a large data transfer, the developer is faced with the question of whether to acquire additional T1 lines. Acquiring additional T1 lines comes at additional expense. Furthermore, the developer may not have a need for the increased data capacity for day-to-day operations, making acquiring additional T1 lines cost inefficient.

Similar to developers, others may also want to transfer data to a network storage location. For example, others may wish to simply backup their data with a copy that resides at another location. These users may also transfer large amounts of data over a network, which can take a substantial amount of time to transfer. Consequently, any entity that wishes to transfer a large amount of data is faced with the question of how to securely transfer the data in a reasonable amount of time without unduly burdening its own network resources or without incurring an additional expense to obtain a greater data transfer rate capacity.

To avoid data transfer delays and capacity limitations, individuals who wish to transfer large amounts of data to network storage devices can simply avoid transferring their data over a network altogether. Instead, these individuals can store their data on portable media and send the media by courier to a location where the data is transferred from the media. Since the data is transferred directly from the media, transfer rates to a network storage device are dramatically faster. However, when sending data in this manner, the recipient of the media (e.g., the service provider) who loads the data to a customer's account may want to confirm that the media was sent pursuant to the customer's authorization. Without proper safeguards, an imposter could send media that includes malicious code or code that is designed to steal information, which could then be unsuspectingly transferred to a network storage device.

In view of the foregoing, there are data transfer rate and capacity limitations that limit the amount of data that can be transferred over a network during a given time period. As an alternative to transferring data over a network, one may send data on physical media for direct transfer, but safeguards are needed to ensure that, for example, only data that is actually authorized is transferred. Therefore, there is a need for improved systems and methods that overcome the above problems.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
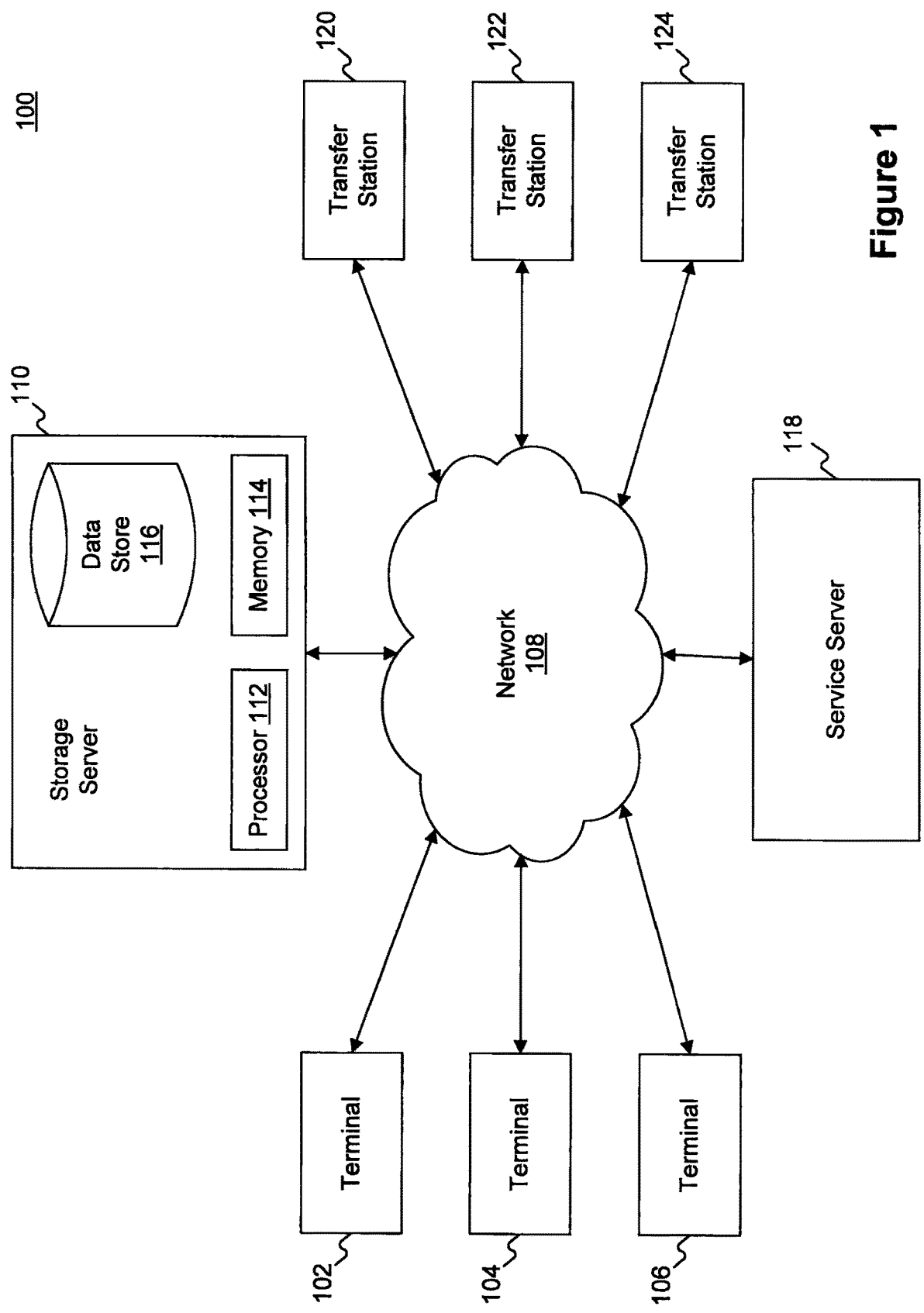
FIG. 1 is a diagram of an example of a system for authenticating a storage device.

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, or adding blocks to the disclosed methods. Accordingly, the following detailed description is not limiting of the disclosed embodiments. Instead, the proper scope is defined by the appended claims.

Disclosed embodiments provide computer-implemented systems and methods for identifying and authenticating storage devices. Storage devices may include any media, such as universal serial bus (USB) drives, CD-ROMs, DVD-ROMs, other optical discs, etc., that can store data. Disclosed embodiments may make use of one or more storage devices to transmit, for example, hundreds of gigabytes or terabytes of data via physical media. Furthermore, disclosed embodiments provide systems and methods whereby a recipient of a storage device can identify and authenticate the sender.

In one embodiment, a sender who wants to have his or her data uploaded to a remotely accessible storage device, such as a network storage device may store the data on a portable storage device, such as an internal hard drive, external USB hard drive, flash memory device, or compact disc, among other possibilities. The sender may create a manifest that includes an identifier of a destination or storage location, such as an account, a unique identifier of the sender, and a return shipping address. Next, the sender may electronically transmit the manifest to a provider of the network storage device. The provider of the network storage device may return a unique device identifier, such as a device or job identifier. The sender may sign, for example, the manifest, the device or job identifier, and/or the sender identifier with a secret key to create a digital signature. Creation of the digital signature may be according to any number of cryptographic techniques (e.g., Public Key Infrastructure (PKI), etc.). The resulting digital signature may be copied to a location on the portable storage device, such as the root directory. The sender may then pack and ship the storage device to the provider.

Once at a data center of the provider, the provider may mount the storage device to a port of a transfer station or load the storage device via a drive of the transfer station. The provider may then identify and authenticate the storage device using the digital signature that was previously saved to the storage device. For example, the provider may send the digital signature to an external service to validate the signature and confirm that the sender was in possession of the secret key. As part of the validation, the external service may check the digital signature with the secret key, which may be in the external service's possession. The external service may retrieve the correct secret key by using, for example, a public key identifier, which may be stored on the storage device. Once verified, the provider may then transfer the data from the storage device to the network storage device via the transfer station. Accordingly, disclosed embodiments allow the provider to authenticate that the storage device came from someone in control of the sender's secret key.

Consistent with a disclosed embodiment, a method is provided for authenticating a storage device. The method may include receiving, from a sender, a manifest. The manifest may identify a destination. The method may further include validating a format of the manifest and transmitting, to the sender, a device identifier. The method may further include receiving the storage device from the sender. The storage device may have a digital signature stored thereon. A transfer station may read the digital signature from the storage device. The method may further include validating the digital signature, retrieving the manifest based on the device identifier, and authorizing, based on the validation of the digital signature, a transfer of one or more files from the storage device via the transfer station to the destination identified in the manifest.

Consistent with another disclosed embodiment, a computer-implemented method is provided for authenticating a storage device. The method may include receiving a manifest. The manifest may identify a destination. The method may further include reading, by a transfer station, a digital signature from the storage device, validating the digital signature, and authorizing, based on the validation of the digital signature, a transfer of one or more files from the storage device via the transfer station to the destination identified in the manifest.

Consistent with yet another disclosed embodiment, a system is provided for authenticating a storage device. The system may include a server that is in communication with a network. The server may include a processor and a data store. The system may further include a transfer station in communication with the network. The transfer station may be operable to receive a manifest that identifies a destination, read a digital signature from the storage device, validate the digital signature, and authorize, based on the validation of the digital signature, a transfer of one or more files from the storage device to the destination identified in the manifest.

Consistent with other disclosed embodiments, a computer-readable storage medium may store program instructions, which when executed by a processor, perform any of the above-described methods.

It is to be understood that both the foregoing general description and the following detailed description are exemplary and explanatory only and are not restrictive of disclosed embodiments, as claimed.

FIG. 1 is an example of a system 100 for authenticating a storage device, consistent with a disclosed embodiment. System 100 may provide functionality for a network storage provider to authenticate a storage device. As shown in system 100, terminals 102-106, storage server 110, service server 118, and transfer stations 120-124 are connected to a network 108. One of skill in the art will appreciate that although three terminals, one storage server, one service server, and three transfer stations are depicted in FIG. 1, any number of these components may be provided. Furthermore, one of ordinary skill in the art will recognize that one or more components of system 100 may be combined and/or divided into subcomponents. For example, functionality provided by the transfer stations and the storage server may be combined and/or functionality provided by the service server and storage server may be combined.

Network 108 provides communications between the various components in system 100, such as terminals 102-106, storage server 110, service server 118, and transfer stations 120-124. In addition, terminals 102-106, storage server 110, service server 118, and/or transfer stations 120-124 may access legacy systems (not shown) via network 108, or may directly access legacy systems, data stores, or other network applications. Network 108 may be a shared, public, or private network, may encompass a wide area or local area, and may be implemented through any suitable combination of wired and/or wireless communication networks. Network 108 may further comprise an intranet or the Internet.

Terminals 102-106 may be any type device for communicating with storage server 110 and/or service server 118 over network 108. For example, users of terminals 102-106 may access and/or receive data from storage server 110 and/or service server 118. Terminals 102-106 may be personal computers, handheld devices (e.g., PDAs, cellular phones, etc.), or any other appropriate computing platform or device capable of exchanging data with network 108. Terminals 102-106 may each include a processor (not shown), a memory (not shown), and one or more ports (not shown) for mounting storage devices (e.g., USB drives) and/or one or more drives for loading media (e.g., optical discs). Furthermore, terminals 102-106 may execute program modules that provide one or more graphical user interfaces (GUIs) for interacting with network resources, such as storage server 110 and/or service server 118.

Storage server 110 may comprise a general purpose computer (e.g., a personal computer, network computer, server, or mainframe computer) having one or more processors that may be selectively activated or reconfigured by a computer program. Storage server 110 may be implemented in a distributed network. For example, storage server 110 may communicate via network 108 with additional storage servers (not shown), which may enable storage server 110 to distribute processes for parallel execution by a plurality of storage servers. Collectively, storage server 110 and these additional storage servers may comprise a storage area network (SAN). Alternatively, storage server 110 may be specially constructed for carrying-out methods consistent with disclosed embodiments.

Storage server 110 may include a processor 112, a memory 114, and a data store 116. Memory 114 may comprise one or more memory or storage devices that store data as well as software. Memory 114 may also comprise, for example, one or more of RAM, ROM, magnetic storage, or optical storage. Memory 114 may store program modules that, when executed by processor 112, perform one or more processes for enabling access to data residing on data store 116.

Data store 116 may comprise a plurality of storage devices, such as disk storage devices, optical storage devices, etc. For example, data store 116 may comprise multiple disk drives that combine to form a disk array. The disk array may include, for example, a disk array controller, a cache, disk enclosures, and a power supply. The disk array controller may connect to network 108 via a port (not shown), which may serve as an interface between the disk array controller and network 108.

Storage server 110 may host various data, including data providing Internet sites, as well as provide functionality for authenticating users and providing access to the data. For example, data store 116 may store pages that are displayable by a computer executing software, such as an Internet browser. Storage server 110 may allow users at, for example, terminals 102-106 to access Internet sites being hosted by storage server 110. Furthermore, storage server 110 may allow providers of Internet sites (e.g., developers, site administrators, etc.) being hosted by storage server 110 to access, modify, and load data onto storage server 110. These users may access storage server 110 over network 108 through an Internet browser or software application running on any one of terminals 102-106. In some embodiments, the data may be accessible through other network mechanism, such as through an application program interface (API) of a Web Service.

Storage server 110 may transmit a document (e.g., a JavaScript Object Notation (JSON) document, an Extensible Markup Language (XML) document, or a web page) that is accessible by an Internet browser executing on one of terminals 102-106. The document may include options for a user to log onto a secure site provided by storage server 110. For example, users may log onto a secure site provided by storage server 110 by supplying credentials, such as a username and a password. Because the Internet site may use a secure communication environment, such as an HTTPS (hypertext transfer protocol secure) environment to transfer data over network 108, data transfer is assumed to be secure.

Service server 118 may comprise a general purpose computer (e.g., a personal computer, network computer, server, or mainframe computer) having one or more processors (not shown) that may be selectively activated or reconfigured by a computer program stored in memory (not shown). Service server 118 may be implemented in a distributed network, such that service server 118 may communicate via network 108 with additional service servers (not shown). Alternatively, service server 118 may be specially constructed for carrying-out methods consistent with disclosed embodiments.

In operation, service server 118 may coordinate operations of a service for authenticating storage devices. For example, service server 118 may allow users at terminals 102-106 to access the service to submit and/or monitor requests to ship physical media to a provider that will upload data from the physical media to storage server 110. For example, a user who wants to have his or her data uploaded to storage server 110 may submit a request from one of terminals 102-106. The request may include a manifest pertaining to the request, which may be in the form of a manifest file that identifies the user and specifies a storage location for the data. Manifest files are discussed below in further detail. Service server 118 may further store the manifest and return data and/or instructions to the user at one of terminals 102-106. For example, the instructions may indicate an address to which the user should ship a storage device, such as an external USB hard drive. Service server 118 may further provide status information to users at terminals 102-106, as discussed below in further detail.

Transfer stations 120-124 may comprise general purpose computers (e.g., personal computers, network computers, servers, or mainframe computers) having one or more processors (not shown) that may be selectively activated or reconfigured by a computer program. Transfer stations 120-124 may communicate via network 108 with storage server 110. Furthermore, in some embodiments, transfer stations 120-124 may implement restrictive safeguards such that data may only be loaded from transfer stations 120-124 to storage server 110. Transfer stations 120-124 may include one or more access ports (not shown) and/or drives (not shown) for mounting or loading storage devices, such as USB drives, CD-ROMs, DVD-ROMs, other optical discs, etc. For example, transfer technicians may mount or load storage devices to the access ports and/or drives of transfer stations 120-124. Once a storage device is attached or loaded to one of transfer stations 120-124, the storage device may be authenticated by reading a signature file saved to the storage device. Further details concerning the authentication of storage devices are discussed below.

Figure 2:
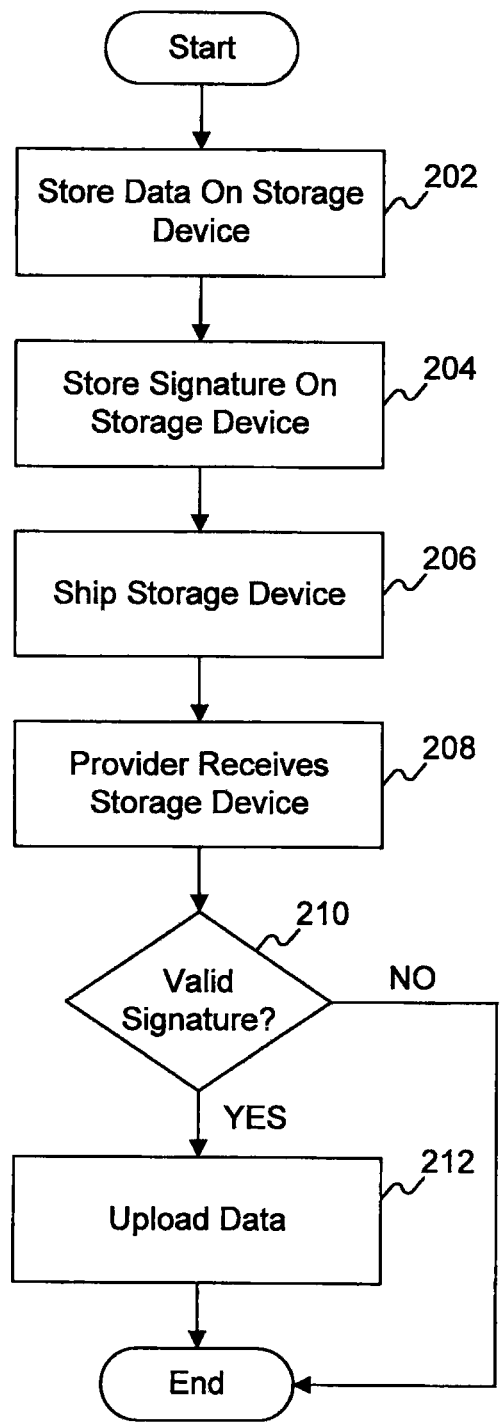
FIG. 2 is a flow diagram of an example of a routine for preparing and authenticating a storage device.

FIG. 2 is a flow diagram of an example of a routine 200 for preparing and authenticating a storage device, consistent with a disclosed embodiment. Routine 200 provides an overview of a process in which data files are stored on a storage device, which is then transported, authenticated, and uploaded to a network storage location (e.g., storage server 110). Further details regarding the process are discussed in connection with FIGS. 3 and 4.

In block 202, a user at one of terminals 102-106 may store data on a storage device. The data may include, for example, data files intended for upload to a network storage device, such as storage server 110. The user may transfer the data from terminal 102 to a portable storage device, such as a USB drive, CD-ROM, DVD-ROM, other optical disc, etc., which may be mounted or inserted into a port or drive that is in communication with terminal 102.

In block 204, the user may store a digital signature on the storage device. The user may transfer the digital signature to the storage device via terminal 102. For example, the user may store the digital signature on the root directory of the storage device or in a particular folder.

In block 206, the user may ship the storage device to a provider that will host the data on a network storage device, such as storage server 110. As part of the process, the user may pack the storage device, print a shipping label, and transfer the package to a shipping service. The shipping service may then physically transport the package to the provider using one or more modes of transportation (vehicles, airplanes, trains, ships, etc.).

In block 208, the provider may receive the storage device from the shipping service. Next, in decision block 210, the provider may determine whether the storage device includes a valid digital signature. To determine whether the storage device includes a valid signature, the provider may mount or load the storage device to one of transfer stations 120-124. Once mounted or loaded, one of transfer stations 120-124 may read the digital signature and determine whether the digital signature is valid. As part of the validation process, transfer stations 120-124 may access data residing on, for example, service server 118. If the digital signature is valid, then the process proceeds to block 208. If the digital signature is not valid, then the process ends. Further details regarding authenticating digital signatures are discussed below.

In block 212, the provider may upload the data files to a destination, such as an account associated with the user. For example, the provider may use one of transfer stations 120-124 to transfer the data files over network 108 to storage server 110.

Although the above discussion and the following discussion refers to the provider of storage server 110 as being the party that operates transfer stations 120-124, one of ordinary skill in the art will recognize that a third party could perform similar functions as the provider or on the provider's behalf.

Figure 3:
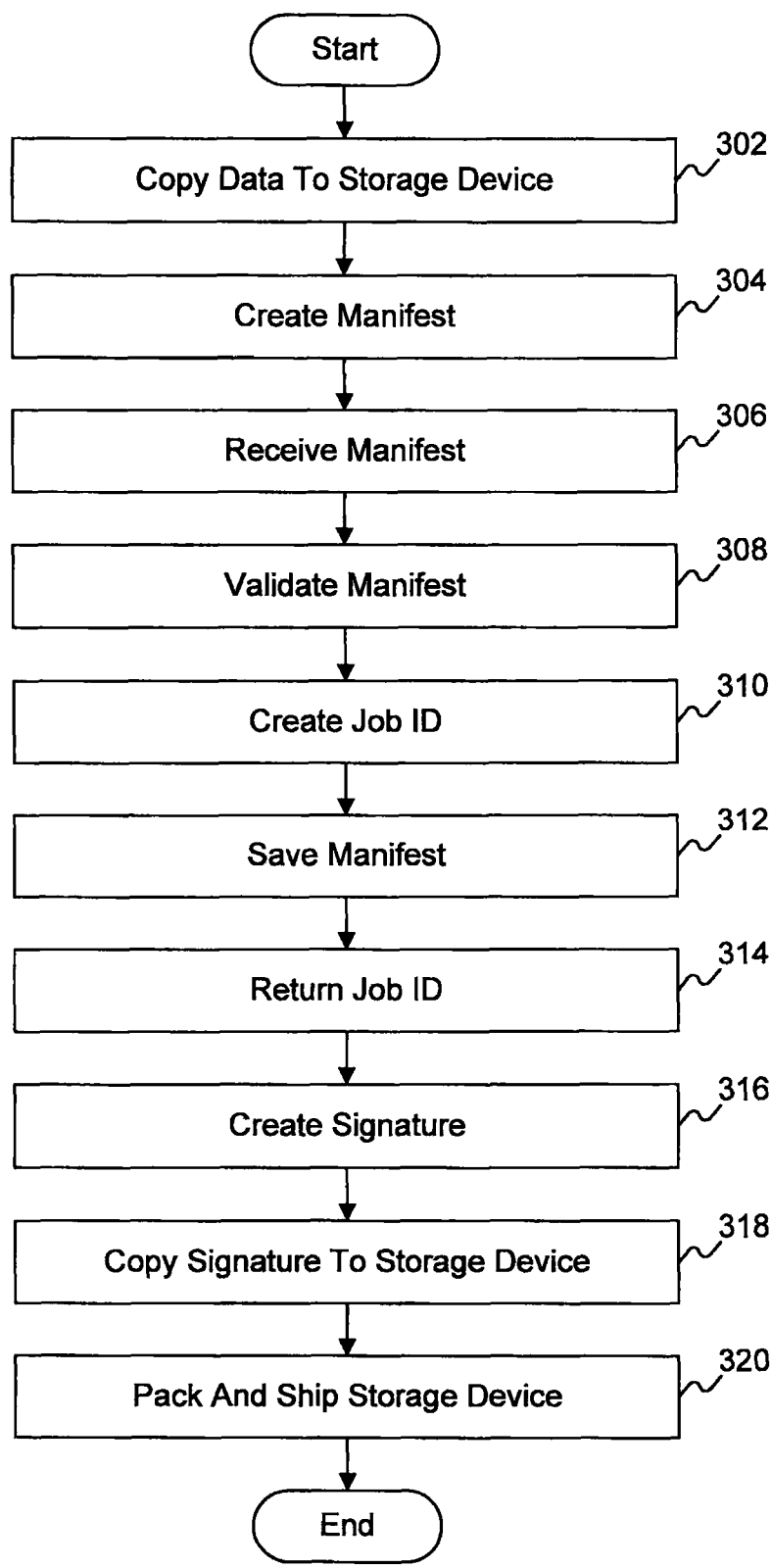
FIG. 3 is a flow diagram of an example of a routine for preparing a storage device.

FIG. 3 is a flow diagram of an example of a routine 300 for preparing a storage device, consistent with a disclosed embodiment. Routine 300 provides further details regarding a process in which a user prepares a storage device for shipment.

Prior to the start of routine 300, a user may be authenticated by, for example, service server 118. For example, prior to the start of routine 300, service server 118 may transmit a document (e.g., a web page) that is accessible by an Internet browser executing on one of terminals 102-106. The document may include options for a user to log onto a secure site provided by service server 118. The user may log onto the secure site by supplying credentials, such as a username and a password. Once authenticated, routine 300 may begin.

In block 302, the user may copy data to a portable storage device. As discussed above, a user at one of terminals 102-106 may store data that may include, for example, data files intended for upload to a network storage device, such as storage server 110. The user may transfer the data from, for example, terminal 102 to a portable storage device, such as an internal hard drive, an external USB hard drive, flash memory device, CD-ROM, DVD-ROM, other optical disc, etc., which may be mounted to a port or loaded into a drive that is in communication with terminal 102. In some implementations, the storage device may need to support a particular file system format (e.g., FAT32, ext3, NTFS, HFS) and each file that is stored on the storage device may need to be less than or equal to a particular file size (e.g., five gigabytes). In still other implementations, the user may encrypt the data that is stored on the storage device.

In block 304, the user may create a manifest, which may identify the contents of the storage device. The user may create the manifest at, for example, terminal 102, using a text editor. In one implementation, the manifest may comprise a text file. In other implementations, the user may use a web user interface (UI) to create the manifest.

The manifest may be of a particular file format (e.g., YAML, XML, JSON, etc.) and may include several pieces of information. For example, the manifest may include an identifier of a destination or storage location, such as an account. The manifest may further include a public key identifier (ID) of the user or a recipient of the storage device. The public key ID may constitute a string that uniquely identifies the user or recipient. In some implementations, any unique identifier of the user, sender, recipient, or the storage device may be used. Furthermore, the public key ID may have a corresponding secret key ID. The secret key may be used to generate a digital signature, which is discussed below in further detail, to authenticate the storage device.

The following is an example of a manifest (e.g., a manifest file named "manifest123.txt"):
destination: my-account
accessKeyId: 0FF36Q3V0WFFSRW0EXG2
manifestVersion: 1.0
returnAddress:
  name: Mr. Smith
  street1: 123 Main Street
  city: Seattle
  stateOrProvince: WA
  postalCode: 98104
  phoneNumber: 206-555-1000
  country: USA In the above example, the manifest file specifies an identifier of a destination, e.g., a single storage location for uploading files (e.g., "my-account"). The manifest further includes an access key ID (e.g., "0FF36Q3V0WFFSRW0EXG2"), a manifest version (e.g., "1.0"), and a return address. The provider may use the return address so that, once the storage device has been processed, it may be returned to the user.

The above is merely illustrative and manifests may include additional information or less information than shown above. For example, the manifest may include additional information, such as one or more content types for files, metadata, instructions to ignore certain files (e.g., ignore files with a particular extension), and may specify storage locations for certain files (e.g., all files of type ".jpg" should be uploaded to a folder named "/images/"). For additional security, the manifest include a disk inventory (e.g., a list of files and checksums). In some embodiments, a manifest may not necessarily include all of the information shown in the exemplary manifest file. For example, in some implementations, after processing, the storage device may not been returned and may instead be destroyed. In such an implementation, the return address may be omitted from the manifest.

In block 306, the provider of a data hosting service (e.g., a provider of storage server 110) may receive the manifest from the user via a secure channel. For example, the user may send the manifest over network 108 from terminal 102 to service server 118. In one implementation, the manifest may be submitted via email as an attachment. In other implementations, the manifest may be submitted via a web UI or a web API (e.g., implemented through a protocol such as SOAP).

In some implementations, in block 306, the provider may further receive an encryption key from the user via the secure channel. For example, in block 302, the user may have encrypted the contents of the storage device. Accordingly, the provider (e.g., a provider of storage server 110) may later use the encryption key to decrypt the contents of the storage device.

In block 308, service server 118 may validate the format of the manifest and/or content of the manifest. For example, service server 118 may invoke a service to determine whether the manifest includes a minimum amount of required information and whether the manifest is properly formatted. Furthermore, as part of the validation process, service server 118 may confirm that the user has identifier a valid storage location or locations (e.g., an account) in the manifest.

In block 310, service server 118 may create a device or job ID. For example, one of transfer stations 120-124 may use the job ID to retrieve the manifest and/or to identify the transfer job at a later time. In other implementations, service server 118 may not need to assign a job ID, because the user may have provided the job ID in block 306. For example, service server 118 may have previously assigned the user a globally unique identifier (GUID), which service server 118 may subsequently use to retrieve the manifest and the job ID.

In block 312, service server 118 may store the manifest. Service server 118 may optionally store the encryption key as part of this block. Optionally, service server 118 may transmit the job ID to storage server 110.

In block 314, service server 118 may transmit the job ID to the user at terminal 102 via network 108. For example, service server 118 may send a success message (e.g., an e-mail message) to the user with the job ID.

In block 316, the user may create a digital signature. The digital signature may uniquely identify the transfer job and be used to authenticate the request at a later time. To create the digital signature, the user may need a job ID, the manifest, a public key ID, and a secret key ID.

In one implementation, as part of the process of creating the digital signature, an encryption service being executed at terminal 102 or being provided over network 108 via, for example, service server 118, may be passed parameters, such as the manifest (e.g., "manifest123.txt"), the job ID (e.g., 3343), and the user's public key ID (e.g., OFF36Q3V0WFFSRW0EXG2) or the recipient's public key ID. The service may prompt the user for the user's secret key ID. In other embodiments, the service may prompt the user for a secret key ID of a recipient of the storage device, such as a provider of a network storage device.

After entering the secret key ID, the service may create a digital signature, using the secret key ID to sign the passed parameters (e.g., the manifest, the job ID, and/or the public key ID). Accordingly, as the digital signature is based on the manifest, the digital signature can be later used to validate that the manifest on the storage device is the same as the manifest that was received by service server 118 in block 306 (e.g., the digital signature can validate that the manifest at the time of the signing and the one sent to the provider are byte-for-byte identical).

In block 318, the user may copy the digital signature to the storage device. For example, the user may use terminal 102 to store the digital signature on the root directory of the storage device or in a particular folder. In addition, as part of block 318, the user may store the job ID and/or the public key ID to the storage device, along with the digital signature.

In one implementation, the job ID, the public key, and the digital signature may be stored separately on the storage device. In another implementation, the user may create a signature file that comprises the job ID, the public key ID, and the digital signature. The name of the signature file may have a required format (e.g., the signature file may be required to be named "Signature").

As part of block 318, the user may also copy the data files that the user wishes to transfer from terminal 102 to the storage device. Copying the data files may occur before or after this step, as deemed appropriate by the user. As the storage device includes the job ID, the provider may use the job ID to retrieve the manifest from service server 118. In a preferred embodiment, the actual manifest is not stored on the storage device.

In block 320, the user may pack the storage device and ship the storage device to the provider, which will host the data on network storage, such as storage server 110. For example, the user may pack the storage device, print a shipping label, and transfer the package to a shipping service provider. The shipping service provider may then physically transport the package using one or more modes of transportation (vehicles, airplanes, trains, ships, etc.). In other implementations, service server 118 may convert the digital signature into a barcode such that a package or physical object itself could be authenticated according to disclosed embodiments.

Figure 4:
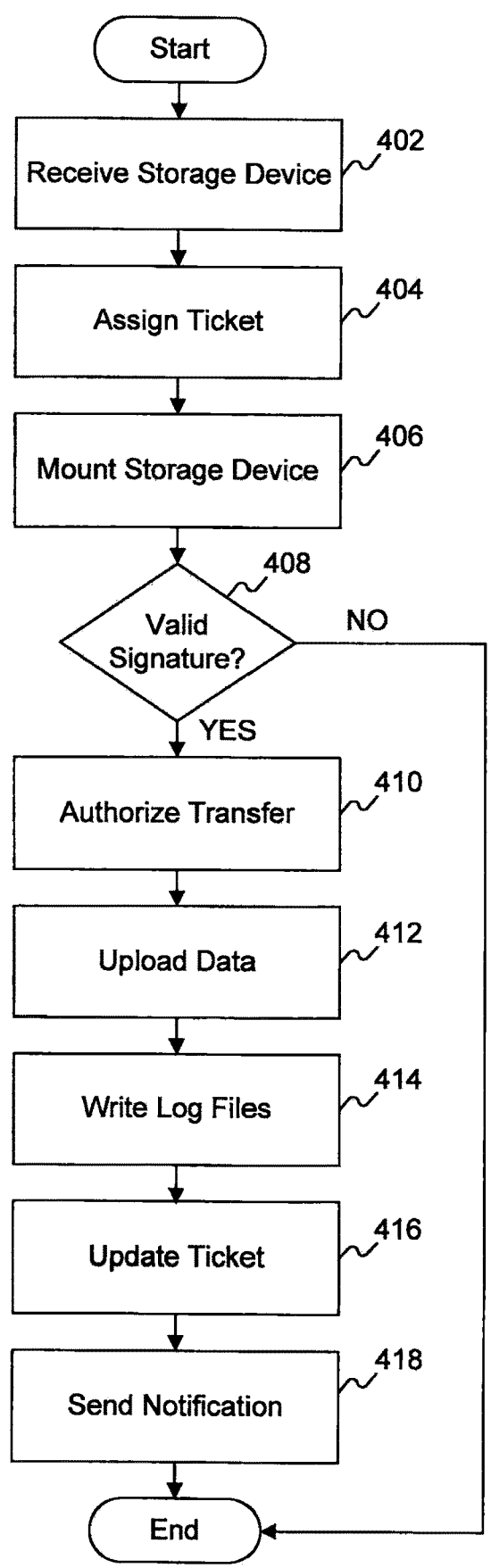
FIG. 4 is a flow diagram of an example of a routine for authenticating a storage device.

FIG. 4 is a flow diagram of an example of a routine 400 for authenticating a storage device, consistent with a disclosed embodiment. Routine 400 provides further details regarding a process in which a provider receives a storage device, authenticates the storage device, and transfers the data from the storage device. Accordingly, routine 400 may occur after routine 300, for example.

In block 402, the provider may receive the storage device at a facility. For example, as part of the intake process of the storage device, the provider may check the package (i.e., verify that the package is on an expected package list), check where the package originated from, and perform a security check before forwarding the package to a data center, which may house transfer stations 120-124.

In block 404, the provider may create a ticket for the storage device (i.e., assign the package a tracking number). For example, receipt of the package may be input into a terminal (not shown) in communication service server 118. Accordingly, service server 118 may create a ticket number that is associated with the ticket and the package.

In block 406, the provider may mount the storage device to one of transfer stations 120-124, such as transfer station 120. As discussed above, transfer stations 120-124 may include one or more access ports (not shown) or drives for mounting or loading storage devices, such as internal hard drives, USB drives, CD-ROMs, DVD-ROMs, other optical discs, etc.

In decision block 408, transfer station 120 may read the signature file from the storage device. For example, the job ID and/or the public key ID may be stored together as part of a signature file. Alternatively, as discussed above, in other embodiments, transfer station 120 may read the job ID, the public key ID, and/or the digital signature from the storage device, which may each be stored as separate files.

As part of block 408, transfer station 120 may send the digital signature (either separately or as part of a signature file) via network 108 to an external service to validate the digital signature, which may verify that the sender was in possession of the secret key. For example, the external service may be provided by, for example, service server 118. As part of the validation, the external service may check the digital signature with the secret key (e.g., the user's secret key or a secret key of the recipient), which may be in the external service's possession (e.g., stored by service server 118). The external service may retrieve the correct secret key by using, for example, the public key ID, which transfer station 120 may pass to the external service. Accordingly, the external service may authenticate that the storage device came from someone in control of the user's secret key ID.

If the digital signature is valid, the external service may transmit a "success" result to transfer station 120 and the process proceeds to block 410. If the digital signature is not valid, then the process ends.

In block 410, storage server 110 may perform a process to authorize the transfer of the files to the user's account from transfer station 120. For example, the user's account may only authorize the user to upload files. However, since transfer station 120 is going to perform the upload, transfer station 120 may need authorization, because the user is not in control transfer station 120. Accordingly, in block 410, a security token service may submit a request to, for example, storage server 110 or another service, in order to allow transfer station 120 to upload data to the user's account. In some implementations, block 410 may be optional as such authorization may not be required and transfer station 120 may implicitly have authorization to upload data.

In block 412, transfer station 120 may transfer or upload the data files to an account or storage location associated with the user. For example, the provider may use one of transfer stations 120-124 to transfer the data files over network 108 to storage server 110. Optionally, as part of block 412, transfer station 120 may retrieve an encryption key sent by the user from service server 118 to decrypt the contents of the storage device.

The transfer of the files may occur according to the manifest. For example, transfer station 120 may retrieve the manifest from service server 118 according to the job ID. At a minimum, the manifest may indicate a destination, such as a single storage location (e.g., a directory of the user's account) of storage server 110 where the files should be uploaded. The manifest may further include additional rules or parameters, which may designate, for example, certain storage locations for certain files (e.g., all image files are to be uploaded to an existing directory named "/images/" on the user's account).

In block 414, transfer station 120 may create one or more log files. For example, transfer station 120 may create an upload report, which may be uploaded to the user's account on storage server 110. The upload report may include checksums and file stamps (e.g., date and time of upload). For example, the report may provide, on a line item basis, for every file, an upload time, name on disk, disk in storage server 110, a checksum, a status code, a number of bytes, etc. Transfer station 120 may further create a history log file that may be retained by the provider for billing purposes. The provider may use the history log file to determine a monetary charge for uploading the data (e.g., a monetary charge per unit of uploaded data). Furthermore, the provider may retain the history log for purposes of dispute resolution. Transfer station 120 may transmit the history log file to, for example, service server 118 for storage. Transfer station 120 may further create an error log file that may identify errors that occurred during the upload and/or a performance log file that reflects performance data (e.g., how long each file took to upload, how many retries, etc.) for efficiency monitoring purposes.

In block 416, transfer station 120 may transmit an update request to service server 118 in order to update the ticket corresponding to the job. For example, service server 118 may update the ticket to indicate that the job has been successfully completed.

In block 418, service server 118 may send a notification to the user that the process has been successfully completed. The notification may be sent, for example, via an e-mail message to an e-mail address associated with the user. Furthermore, the notification may indicate that the provider will ship the storage device (e.g., provide a tracking number for the return package) or may indicate that the job has been completed and the storage device will be destroyed.

During the above process, service server 118 may provide status information to the user at terminal 102. Status information may indicate where a storage device is physically located or a status of a job (e.g., mailroom, data room, job processed, in progress, complete, log access) or may provide information regarding errors during an upload process (e.g., certain files were corrupted, so the user can upload those specific files over network 108).

As one of ordinary skill in the art will appreciate, one or more of blocks 202-212, 302-320, and 402-418 may be optional and may be omitted from implementations in certain embodiments. Furthermore, functionality provided by one or more of blocks 202-212, 302-320, and 402-418 may be subdivided into multiple blocks or combined.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Furthermore, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A computer-implemented method, comprising:
    receiving a manifest from a sender, the manifest identifying a destination for data storage;
    receiving a storage device from the sender;
    reading security information from the storage device;
    validating the security information;
    associating the manifest with the storage device based on an identifier associated with the validated security information read from the storage device; and
    authorizing, based on the validation of the security information, transferring of data of the storage device to the destination identified in the manifest.

2. The computer-implemented method of claim 1, wherein the identifier is a device identifier assigned to the storage device.

3. The computer-implemented method of claim 1, wherein the data comprises one or more files.

4. The computer-implemented method of claim 1, wherein the security information is based at least on the manifest.

5. The computer-implemented method of claim 1, further comprising:
    before receiving the storage device from the sender, transmitting, to the sender, the identifier.

6. The computer-implemented method of claim 1, wherein the security information comprises a digital signature.

7. The computer-implemented method of claim 6, wherein validating the security information comprises:

determining that a copy of the manifest that was used for signing the digital signature is identical to the manifest.

8. A system, comprising:
one or more processors and memory configured to:
   access a manifest received from a sender, the manifest identifying a destination for data storage; and
   access a storage device received from the sender;
   read security information from the storage device;
   validate the security information;
   associate the manifest with the storage device based on an identifier associated with the validated security information read from the storage device; and
   authorize, based on the validation of the security information, a transfer of data of the storage device to the destination identified in the manifest.

9. The system of claim 8, wherein the identifier is a device identifier assigned to the storage device.

10. The system of claim 8, wherein the one or more processors and memory are further configured to:
   read the storage device via a port or a drive of a transfer station.

11. The system of claim 8, wherein the destination is a storage location available over a network.

12. The system of claim 11, wherein the manifest comprises instructions specifying a directory of the storage location for transferring the data.

13. The system of claim 8, wherein the one or more processors and memory are further configured to:
   transmit, to the sender, the identifier.

14. The system of claim 8, wherein the security information comprises a digital signature based at least on the manifest.

15. A non-transitory computer-readable storage medium storing program instructions that, when executed by one or more processors, cause the one or more processors to implement:
   receiving a manifest from a sender, wherein the manifest identifies a destination for data storage;
   reading security information from a storage device, wherein the storage device is received from the sender;
   validating the security information;
   associating the manifest with the storage device based on an identifier associated with the validated security information read from the storage device; and
   authorizing, based on the validation of the security information, transferring of data of the storage device to the destination identified in the manifest.

16. The non-transitory computer-readable storage medium of claim 15, wherein the identifier is a device identifier assigned to the storage device.

17. The non-transitory computer-readable storage medium of claim 15, wherein the security information comprises a digital signature.

18. The non-transitory computer-readable storage medium of claim 17, wherein the digital signature is based at least on the manifest.

19. The non-transitory computer-readable storage medium of claim 18, wherein the program instructions further cause the one or more processors to implement:
   determining that a copy of the manifest that was used for signing the digital signature is identical to the manifest.

20. The non-transitory computer-readable storage medium of claim 15, wherein the program instructions further cause the one or more processors to implement:
   before the receiving of the storage device from the sender, transmitting the identifier to the sender.

* * * * *